US008512118B2

(12) United States Patent
Lui et al.

(10) Patent No.: US 8,512,118 B2
(45) Date of Patent: Aug. 20, 2013

(54) CASHLESS RESERVATION SYSTEM

(75) Inventors: Louis Lui, New South Wales (AU); Robert Linley Muir, New South Wales (AU); David Curry, New South Wales (AU); John Boesen, New South Wales (AU); David Jack, New South Wales (AU)

(73) Assignee: Aristocrat Technologies Australia Pty Limited (AU)

( * ) Notice: Subject to any disclaimer, the term of this patent is extended or adjusted under 35 U.S.C. 154(b) by 894 days.

(21) Appl. No.: 12/103,429

(22) Filed: Apr. 15, 2008

(65) Prior Publication Data

US 2009/0104980 A1 Apr. 23, 2009

Related U.S. Application Data

(63) Continuation-in-part of application No. 11/754,065, filed on May 25, 2007, and a continuation-in-part of application No. 11/744,691, filed on May 4, 2007, said application No. 11/754,065 is a continuation of application No. 11/441,315, filed on May 25, 2006, which is a continuation-in-part of application No. 10/561,486, filed as application No. PCT/AU2004/000799 on Jun. 18, 2004.

(30) Foreign Application Priority Data

| | | |
|---|---|---|
| Jun. 19, 2003 | (AU) | 2003903111 |
| May 5, 2006 | (AU) | 2006902359 |
| May 25, 2006 | (AU) | 2006902818 |
| Apr. 2, 2007 | (AU) | 2007901726 |

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2011.01) |

(52) U.S. Cl.
USPC .......... 463/16

(58) Field of Classification Search
USPC .......... 463/16
See application file for complete search history.

(56) References Cited

U.S. PATENT DOCUMENTS 4,636,951 A 1/1987 Harlick
5,265,874 A 11/1993 Dickinson et al.

(Continued)

FOREIGN PATENT DOCUMENTS

AU 199924974 4/1999
EP 0534718 A2 3/1993

(Continued)

OTHER PUBLICATIONS

Examiner's First Report corresponding to Australian Patent Application No. 2008201645, dated Feb. 23, 2009.

(Continued)

*Primary Examiner* — David L Lewis
*Assistant Examiner* — Reginald Renwick
(74) *Attorney, Agent, or Firm* — McAndrews, Held & Malloy, Ltd.

(57) ABSTRACT

A gaming machine and a gaming system is described. Gaming machines may be reserved by operating a button panel. In certain embodiments the reserved gaming machine or a head system causes the printing of a ticket and when that ticket is read by a bill acceptor, the gaming machine unlocks. In other embodiments, reservation is made by other means, including player cards.

2 Claims, 10 Drawing Sheets

(56) References Cited

U.S. PATENT DOCUMENTS

| | | | | |
|---|---|---|---|---|
| 5,429,361 | A * | 7/1995 | Raven et al. | 463/25 |
| 5,547,202 | A | 8/1996 | Tsumura | |
| 5,586,936 | A | 12/1996 | Bennett et al. | |
| 5,952,640 | A | 9/1999 | Lucero | |
| 5,954,583 | A | 9/1999 | Green | |
| 6,048,269 | A | 4/2000 | Burns et al. | |
| 6,162,122 | A | 12/2000 | Acres et al. | |
| 6,511,377 | B1 | 1/2003 | Weiss | |
| 6,523,829 | B1 | 2/2003 | Walker et al. | |
| 6,634,942 | B2 | 10/2003 | Walker et al. | |
| 6,638,169 | B2 | 10/2003 | Wilder et al. | |
| 6,676,515 | B1 | 1/2004 | Baltz et al. | |
| 6,682,423 | B2 | 1/2004 | Brosnan et al. | |
| 6,743,098 | B2 | 6/2004 | Urie et al. | |
| 6,843,725 | B2 | 1/2005 | Nelson | |
| 6,846,238 | B2 | 1/2005 | Wells | |
| 6,852,029 | B2 | 2/2005 | Baltz et al. | |
| 6,892,182 | B1 * | 5/2005 | Rowe et al. | 705/14.12 |
| 6,896,618 | B2 | 5/2005 | Benoy et al. | |
| 6,896,619 | B2 | 5/2005 | Baltz et al. | |
| 6,916,244 | B2 | 7/2005 | Gatto et al. | |
| 7,004,837 | B1 | 2/2006 | Crowder, Jr. et al. | |
| 7,107,245 | B1 | 9/2006 | Kowalick | |
| 7,134,962 | B2 | 11/2006 | Meyerhofer et al. | |
| 7,139,694 | B2 | 11/2006 | Horn et al. | |
| 7,324,973 | B2 | 1/2008 | Taylor, III | |
| 7,351,146 | B2 | 4/2008 | Kaminkow | |
| 7,419,428 | B2 | 9/2008 | Rowe | |
| 7,594,855 | B2 | 9/2009 | Meyerhofer | |
| 2001/0050311 | A1 | 12/2001 | Avellino | |
| 2002/0070275 | A1 | 6/2002 | Mullins et al. | |
| 2002/0077178 | A1 | 6/2002 | Oberberger et al. | |
| 2002/0111206 | A1 | 8/2002 | Van Baltz et al. | |
| 2002/0128059 | A1 | 9/2002 | Baltz et al. | |
| 2002/0132660 | A1 | 9/2002 | Taylor | |
| 2002/0155887 | A1 | 10/2002 | Criss-Puszkiewicz et al. | |
| 2002/0160834 | A1 | 10/2002 | Urie et al. | |
| 2003/0054881 | A1 | 3/2003 | Hedrick et al. | |
| 2003/0060256 | A1 | 3/2003 | Joshi | |
| 2003/0176210 | A1 | 9/2003 | Vancura | |
| 2003/0220138 | A1 | 11/2003 | Walker et al. | |
| 2004/0053684 | A1 | 3/2004 | Chudd et al. | |
| 2005/0054445 | A1 | 3/2005 | Gatto et al. | |
| 2005/0143166 | A1 | 6/2005 | Walker et al. | |
| 2005/0148387 | A1 | 7/2005 | Baltz et al. | |
| 2005/0215316 | A1 | 9/2005 | Rowe et al. | |
| 2005/0215325 | A1 | 9/2005 | Nguyen et al. | |
| 2005/0282626 | A1 | 12/2005 | Manfredi et al. | |
| 2006/0089195 | A1 * | 4/2006 | Walker et al. | 463/25 |
| 2006/0105836 | A1 * | 5/2006 | Walker et al. | 463/25 |
| 2006/0111168 | A1 | 5/2006 | Nguyen et al. | |
| 2007/0191090 | A1 * | 8/2007 | O'Halloran et al. | 463/20 |
| 2007/0298869 | A1 | 12/2007 | Boesen | |
| 2008/0132308 | A1 | 6/2008 | Muir et al. | |
| 2012/0040751 | A1 * | 2/2012 | Peters | 463/29 |

FOREIGN PATENT DOCUMENTS

| | | |
|---|---|---|
| EP | 0589545 | 3/1994 |
| WO | WO 94/12953 | 6/1994 |
| WO | 9416416 | 7/1994 |
| WO | WO 91/16416 | 7/1994 |
| WO | WO 98/12648 | 3/1998 |
| WO | WO0184516 | 11/2001 |
| WO | WO2005072330 | 8/2005 |
| WO | WO2005082480 | 9/2005 |
| WO | WO 2008/127870 | 10/2008 |

OTHER PUBLICATIONS

USPTO Office Action, U.S. Appl. No. 11/754,065 mail date of Jun. 30, 2008.

USPTO Office Action, U.S. Appl. No. 11/754,065 mail date of Apr. 13, 2009.

USPTO Office Action, U.S. Appl. No. 11/754,065 mail date of Oct. 2, 2009.

USPTO Office Action, U.S. Appl. No. 11/754,065 mail date of Jun. 7, 2010.

USPTO Office Action, U.S. Appl. No. 11/441,315 mail date of May 14, 2008.

USPTO Office Action, U.S. Appl. No. 11/441,315 mail date of Mar. 18, 2009.

USPTO Office Action, U.S. Appl. No. 11/441,315 mail date of Sep. 15, 2009.

USPTO Office Action, U.S. Appl. No. 11/441,315 mail date of Apr. 6, 2010.

USPTO Office Action, U.S. Appl. No. 10/561,486 mail date of May 28, 2008.

USPTO Office Action, U.S. Appl. No. 10/561,486 mail date of Apr. 1, 2009.

USPTO Office Action, U.S. Appl. No. 10/561,486 mail date of Sep. 15, 2009.

USPTO Office Action, U.S. Appl. No. 10/561,486 mail date of Jun. 22, 2010.

USPTO Office Action, U.S. Appl. No. 11/744,691 mail date of Feb. 24, 2010.

Statement of Grounds and Particulars in Support of Opposition in the Matter of Australian Patent Application 2007202381 in the name of Aristocrat Technologies Australia Pty Ltd and Opposition thereto by IGT, dated Sep. 8, 2008, 24 pages.

Statement of Grounds and Particulars in Support of Opposition in the Matter of Australian Patent Application 2004248208 in the name of Aristocrat Technologies Australia Pty Ltd and Opposition thereto by IGT, dated May 29, 2008, 20 pages.

International Search Report and Written Opinion corresponding to International Application Serial No. PCT/AU2004/000799, mailed Jul. 28, 2004.

Written Opinion of the International Searching Authority corresponding to International Application Serial No. PCT/AU2004/000799, mailed Jul. 28, 2004.

International Search Report, PCT/AU2004/000799, mailing date of Jul. 28, 2004.

* cited by examiner

CASHLESS RESERVATION SYSTEM

RELATED APPLICATIONS

This application claims priority as a continuation-in-part to pending U.S. application Ser. No. 11/754,065, filed on May 25, 2007, and pending U.S. application Ser. No. 11/744,691, filed on May 4, 2007. U.S. application Ser. No. 11/754,065 claims priority to U.S. application Ser. No. 11/441,315, filed on May 25, 2006, as well as to Australian patent application serial number 2006902818, filed on May 25, 2006, and Australian patent application serial number 2007901726, filed on Apr. 2, 2007. U.S. application Ser. No. 11/744,691 claims priority to an Australian patent application filed on May 5, 2006, as serial number AU2006902359, entitled "A Gaming Machine, a Controller for a Gaming Machine, a Gaming System, and a Gaming Method." U.S. application Ser. No. 11/441,315 claims priority to U.S. application Ser. No. 10/561,486, filed Oct. 18, 2006, and International Application PCT/AU2004/000799 (WO 2004/111954), filed Jun. 18, 2004, which claims priority to serial number AU2003903111, filed on Jun. 19, 2003. Each of these applications is herein incorporated by reference in its entirety.

INTRODUCTION

The present invention relates generally to the field of gaming apparatus and machines and in particular the invention relates to cashless networked gaming systems.

BACKGROUND OF THE INVENTION

A line-of-sight gaming system operates with cashless transfers between a cashier and gaming machines. A player gives money to a cashier who instructs the system to place credits on the players selected machine. The gaming machine is (or should be) in the cashier's line-of-sight so they can see the machine is not currently being played and that once the player has paid that no one else uses the machine.

A disadvantage of these systems is that the number of machines on the gaming floor is limited to those visible to the cashier.

Gaming machines may have a reservation button, enabling players to reserve a gaming machine for their use. The player presses the reserve button and the gaming machine enters the reserve mode, and displays a reserve message. When the reserve button is pressed again the machine exits the reserve mode.

U.S. Pat. No. 5,429,361 describes a gaming system in which a magnetic card is used as a reservation lock. This patent describes a traditional gaming system using magnetic cards, where the reserve key only works when the player's magnetic card is inserted. If they press reserve, then remove their card the machine cannot be unreserved until the card is reinserted. After a predetermined timeout period the machine will automatically unreserve.

Any reference in this specification to the prior art does not constitute, nor should it be considered, an admission that such prior art was widely known or forms part of the common general knowledge in Australia, or in any other jurisdiction, before the priority date of any of the appended claims.

SUMMARY OF THE INVENTION

According to one aspect of the invention, there is provided a gaming machine including a game controller for controlling play of one or more games on the gaming machine; a ticket reader that outputs ticket data when a ticket is read by the ticket reader; a ticket printer that prints tickets readable by the ticket reader; means for processing ticket data from the ticket reader; and reservation means operable by a player of the gaming machine to indicate that the gaming machine is to be reserved; wherein when the reservation means is operated, the ticket printer prints a ticket and locks, maintaining the ticket reader active, and unlocks when the ticket reader reads the printed ticket.

The gaming machine may include an electronic controller between the game controller and the ticket reader, wherein the electronic controller controls the ticket reader to be active when the gaming machine is reserved. The electronic controller may communicate information to a head system when a ticket is read by the ticket reader when the gaming machine is reserved, the information identifying the ticket that has been read. The gaming machine may unlock only after receiving a message from the head system that the ticket is valid.

When the gaming machine is locked, it may be locked without any credits on it and indicia indicating the value of any credits on it at the time the machine was locked are printed on the ticket by the ticket printer.

When the gaming machine is locked, a message indicating the value of any credits on it at the time the machine was locked may be communicated to a head system.

The gaming machine may remain locked for a limited duration, following which the gaming machine may automatically unlock.

The gaming machine may apply qualification criteria before locking, wherein the gaming machine only locks and becomes reserved if the qualification criteria are met.

The gaming machine may charge a player for time that the gaming machine is reserved, with the charge being taken from credit of the player on the gaming machine.

According to another aspect of the invention, there is provided a gaming system including a system controller in communication with a plurality of gaming machines, the system controller providing credit to a gaming machine and causing the issuance of a ticket at a site remote from the gaming machine, wherein when the gaming machine receives the credit, it locks so as to prevent play of the gaming machine, but keeps a ticket reader active, wherein the gaming machine unlocks and allows play of the gaming machine using the credit when the ticket is read by the ticket reader.

The gaming machine may include a ticket printer and a reservation means operable by a player of the gaming machine to indicate that the gaming machine is to be reserved and wherein when the reservation means is operated, the ticket printer prints a ticket and locks, maintaining the ticket reader active, and unlocks when the ticket reader reads the printed ticket.

When the reservation means is operated, the gaming machine may remain locked for a period of time and may unlock after the period of time expires.

According to another aspect of the invention, there is provided a gaming system including a system controller in communication with a plurality of gaming machines that each include ticket readers and ticket printers and a reservation means operable by a player of the gaming machine to indicate that the gaming machine is to be reserved, wherein when the reservation means of a said gaming machine is operated, the ticket printer of that gaming machine prints a ticket and the gaming machine locks, maintaining the ticket reader active, and wherein the gaming unlocks in response to the ticket reader of that gaming machine reading the printed ticket, and also unlocks in response to a signal from the system controller, the signal being communicated by the system controller in response to the ticket being read by a ticket reader of another one of the gaming machines.

The tickets may include indicia associated with a monetary value and when a gaming machine is locked, it is locked without any credits on a credit meter of the gaming machine.

The gaming machines may also include means to identify a player in form other than the ticket reader, and wherein the gaming system associates with a ticket an identifier of a player, and wherein the gaming machine unlocks in response to receipt of the identifier of the player at a gaming machine in the system.

According to another aspect of the invention, there is provided a gaming system including a system controller in communication with a plurality of gaming machines that each include a game controller, a ticket reader, a ticket printer and a reservation actuator operable by a player of the gaming machine to indicate that the gaming machine is to be reserved, wherein when the reservation actuator of a said gaming machine is actuated, the ticket printer of that gaming machine prints a ticket and the gaming machine locks, maintaining the ticket reader active, and wherein the gaming unlocks in response to the ticket reader of that gaming machine reading the printed ticket, and also unlocks in response to a signal from the system controller, the signal being communicated by the system controller in response to the ticket being read by a ticket reader of another one of the gaming machines, wherein at least one of the gaming machines includes an electronic controller between the game controller and the ticket reader, the electronic controller controls the ticket reader to be active when the gaming machine is reserved.

The electronic controller may communicate information to the system controller when a ticket is read by the ticket reader when the gaming machine is reserved, the information identifying the ticket that has been read. The gaming machine may unlock only after receiving a message from the system controller that the ticket is valid.

When the gaming machine is locked, it may be locked without any credits on it and indicia indicating the value of any credits on it at the time the machine was locked are printed on the ticket by the ticket printer.

Further aspects of the present invention and further embodiments of the aspects described in the preceding paragraphs will become apparent from the following description, given by way of example, and with reference to the accompanying drawings.

Figure 1:
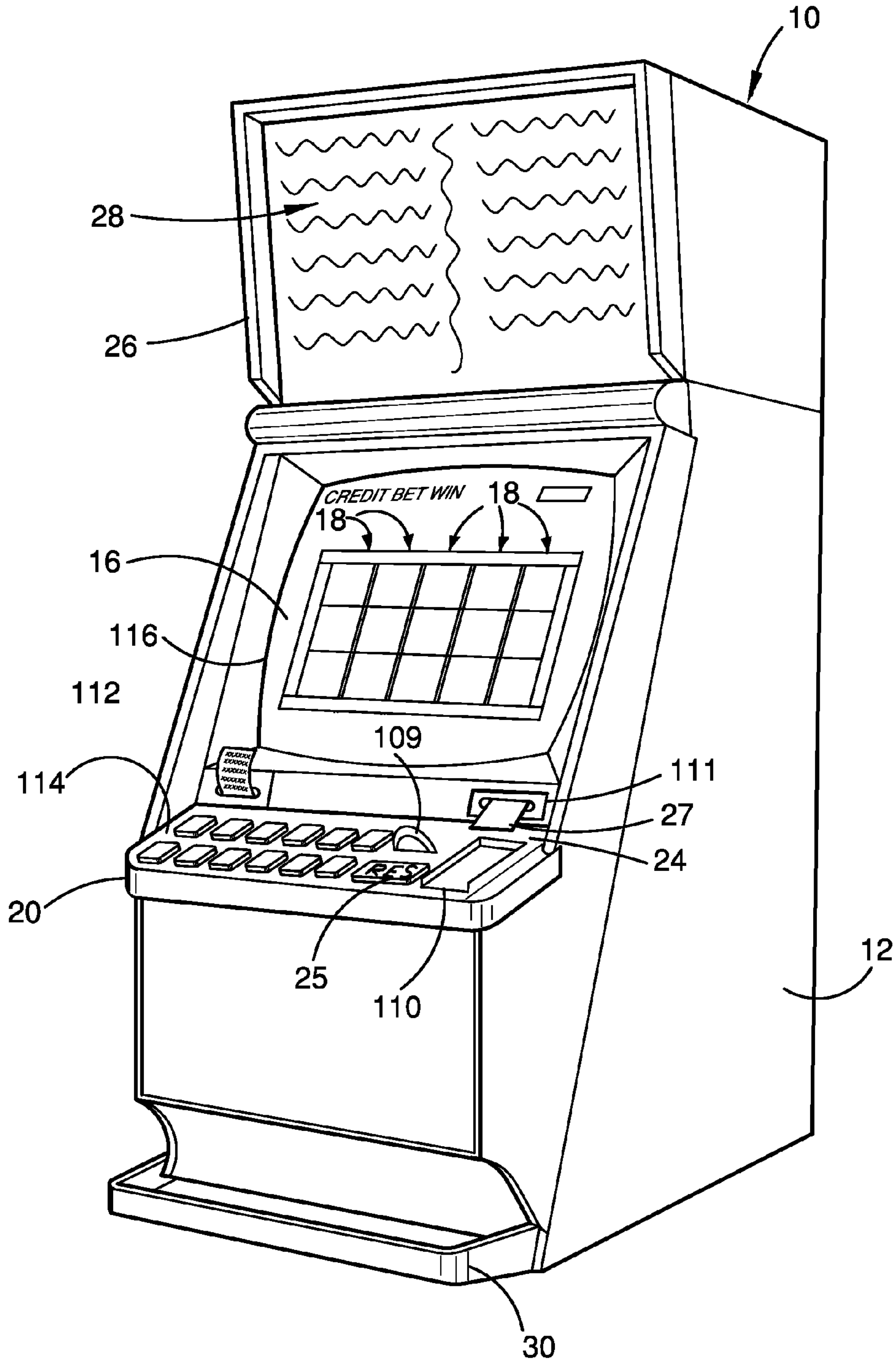
FIG. 1 shows a perspective view of a first style of gaming machine, suitable for use in systems implementing certain embodiments of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Referring to FIG. 1 a typical gaming machine is illustrated of the type to which certain embodiments of the present invention can be applied. The machine illustrated in FIG. 1 is of a type that allows credit input by insertion of coins or bills, but the invention can also be applied to machines that only allow credit input by transfer of credit from a central cashier or from another gaming machine and to systems where credit is transferred by the use of cards and/or tickets.

In FIG. 1, reference numeral 10 generally designates the gaming machine, including a game or games to be played by a player of the machine. The machine 10 includes a console 12 having a display means in the form of a video monitor 116 on which a game 16 is played. The video monitor 116 may be implemented as a cathode ray screen device, a liquid crystal display, a plasma screen, or the like. The game 16 as illustrated in FIG. 1 is a spinning reel game which simulates the rotation of a number of spinning reels 18, however many other styles of game are also possible.

A mid-trim 20 of the machine 10 optionally houses a button panel 114 for enabling a player to play the game 16. The mid-trim 20 also houses a credit input mechanism 24 including a coin input chute 109, which may be omitted in some embodiments, and a bill acceptor 110. The bill acceptor 110 may also act as a ticket reader and references hereinafter to the bill acceptor 110 include functionality to read both currency and tickets with indicia on them indicating a value in currency.

Figure 2:
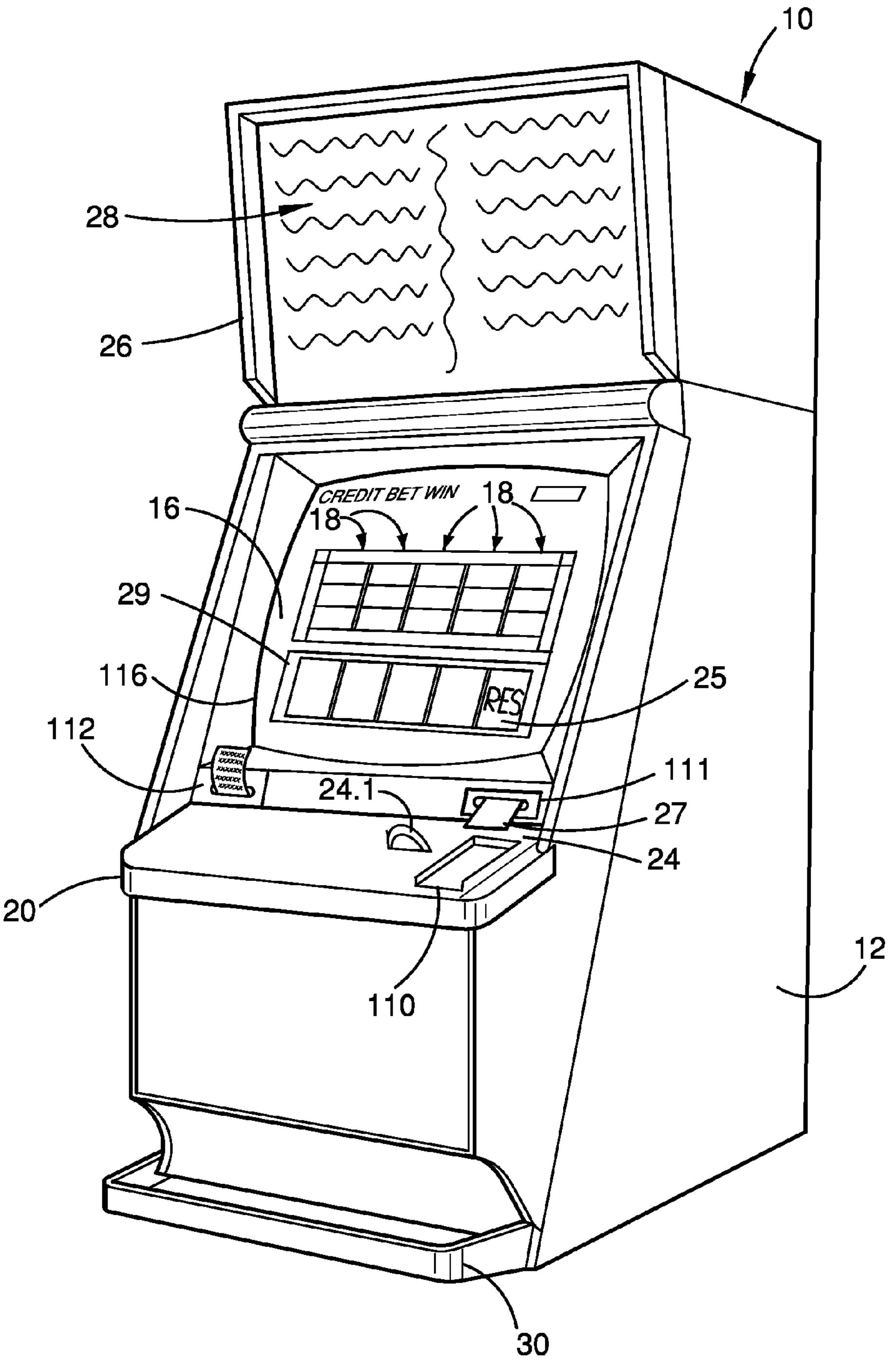
FIG. 2 shows a perspective view of a second style of gaming machine, suitable for use in systems implementing certain embodiments of the present invention.

As illustrated in FIG. 2, some gaming machines use a touch screen for player input, in which case the button panel 114 would not be required on the mid-trim in those machines, but may still be provided if required for the particular implementation of the gaming machine 10. When a touch screen is used, one or more the keys of the button panel 114 of the FIG. 1 machine may be represented as a pseudo-keypad 29 on the screen 16 and touch sensors 115 (refer to FIG. 3) located adjacent the screen surface would detect touching of the screen to record player selections. In all other respects the machines of FIGS. 1 and 2 are essentially functionally identical. Throughout the following description, references to the button panel 114 refer to either or both of physical buttons and a touch screen.

The gaming machine 10 of FIGS. 1 and 2 includes a top box 26 on which artwork 28 is carried. The artwork 28 includes pay-tables, details of bonus awards, etc. A coin tray 30 is mounted beneath the console 12 for cash payouts from the machine 1/O. The gaming machine 10 may also be connected via a computer network to other gaming machines and a system controller and credits can be applied to and cleared from the machine via the network. The credits can either be established at a cashier's station and transferred to the machine or alternatively a player might already have credits in another machine in the network and which they transfer to a new machine that they wish to play.

Gaming System

Figure 3:
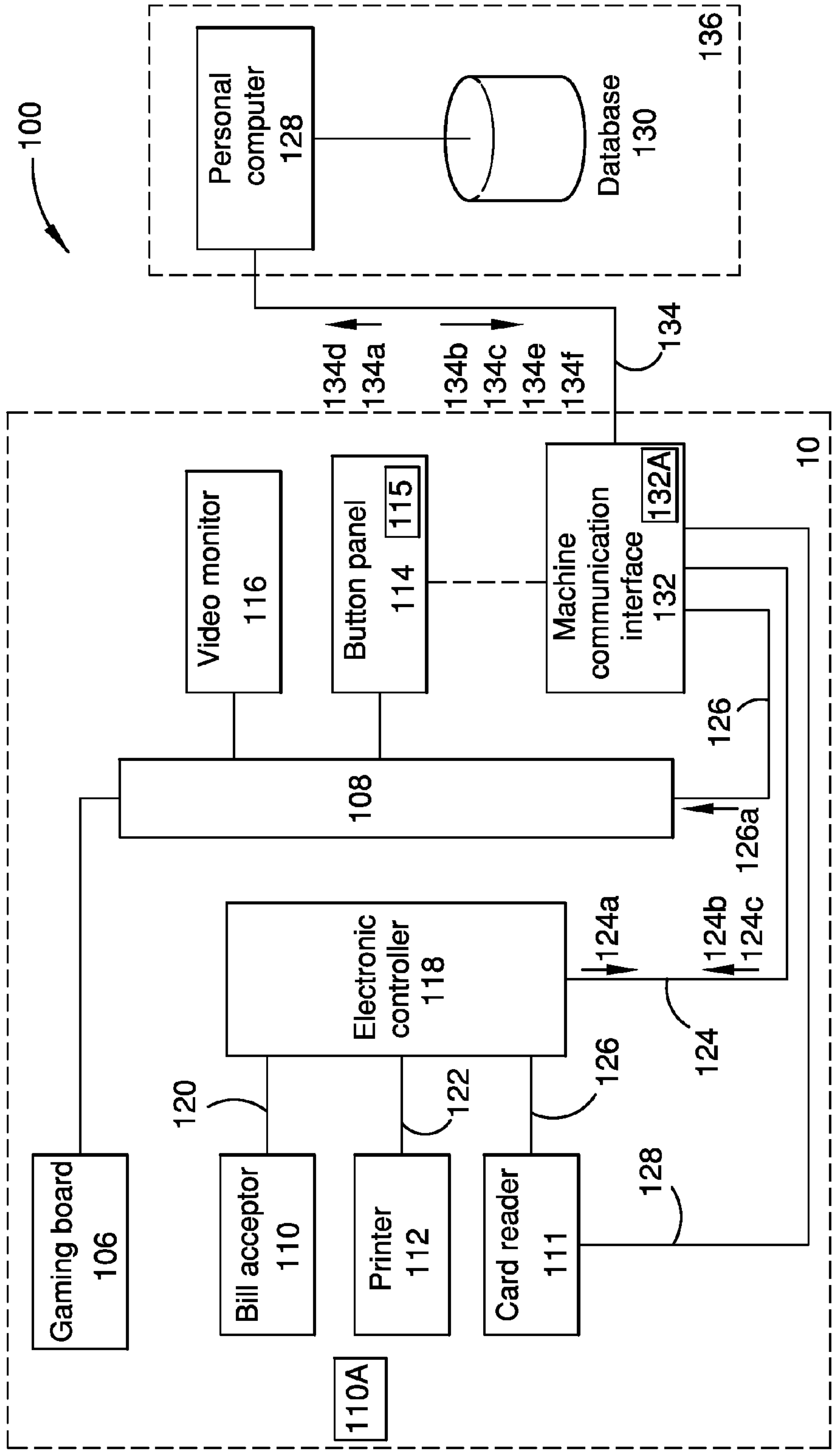
FIG. 3 shows a block diagram of a control circuit of the gaming machines of FIGS. 1 and 2.

Referring to FIG. 3, which is a block diagram of a system 100 embodying certain embodiments of the present invention, the system 100 includes at least one electronic gaming machine 10 (EGM) generally in the form of a typical slot machine that is produced by companies such as Aristocrat Technologies Australia Pty Ltd, and head system 136. In the embodiment shown in FIG. 3, the gaming machine 10 is provided without a coin acceptor 24.1 and without a coin output 30 and is therefore primarily ticket or card-based. In other embodiments, coin input and output may be provided in addition to card and ticket funds transfer, and in still further embodiments, the gaming machine 10 may allow only one of card or ticket funds transfer.

The electronic gaming machine 10 comprises several components including: a gaming board 106; a backplane 108 (that is, a data bus); a bill acceptor 110; a card reader 111; a thermal printer 112; a button panel 114 and/or touch sensors 115; a video monitor 116; an electronic controller 118 and an electronic control unit functioning as a machine communications interface 132 to an external head system 136.

Those skilled in the relevant arts will appreciate that computational functions are largely portable, so that the devices described in relation to FIG. 3 as performing a particular function may be substituted for other devices that perform the same function.

The gaming board 106 is electrically coupled to the backplane 108. The bill acceptor 110 and the thermal printer 112 are electrically coupled to the electronic controller. Thus, the gaming board 106 is in data communication with the bill acceptor 110 and the thermal printer 112 via the backplane 108 and controller 118. A thermal printer is preferred because tickets they print work well with bill acceptors. However, persons skilled in the art will appreciate that other types of printers may be used or indeed that a thermal printer may be provided in addition to an existing printer. The button panel 114 and the video monitor 116 are also coupled (electrically) to the backplane 108. The electronic controller 118 is electrically connected to the bill acceptor 110 and the thermal printer 112 via any appropriate links such as serial RS232 links 120 and 122. The electronic controller 118 may also be connected to the card reader 11 via link 121. Alternatively or in addition, the card reader 111 may be connected directly to the MCI 132. The electronic controller 118 is also electrically connected to the backplane 108 and further connected to the retrofit system 104 via a serial RS232 link 124. It is noted that the backplane 108 is electrically connected to the retrofit system 104 via an appropriate data communication link 126, for example one that supports the x-series protocol, which is a protocol used in New South Wales, Australia.

The gaming board 106 is essentially a computer motherboard and is installed with a memory device (such as an EPROM) that contains one or more game programmes such as Queen of the Nile from Aristocrat Technologies Australia Pty Ltd. Persons skilled in the art will readily appreciate that the gaming board 106 executes the one or more game programmes stored in the memory device and thus provides an electronic game controller. The button panel 114 and the video monitor 116 enable persons to interact with the games. More specifically, the button panel 114 allows persons to operate the games, while the video monitor presents the game to the persons under the control of the gaming board 106.

The electronic machine communications interface 132, performing the functions described herein, may be referred to as a “Ticket Client” as it is a client to the head system that is the “Ticket Master”. A data communication link 134, which may be in the form of an RS485 link or another appropriate link such as Ethernet, is electrically coupled between the computer 128 of the head system 136 and the electronic machine communications interface 132 to allow data to be exchanged there between. The data link 124, which is electrically coupled to the controller 118, is electrically connected to the machine communications interface 132 to allow the controller 118 and the machine communications interface 132 to exchange data with each other. The data link 126, which is electrically connected to the backplane 108, is also electrically connected to the electronic machine communications interface 132.

The electronic gaming machine 10 may be formed by retrofitting an existing machine. For example, an existing machine may not have the electronic controller 118 and may not have the machine communications interface 132. Both of these may be added to the gaming machine 10 in a retrofit of the gaming machine 10 to allow the ticketing functions herein described. Alternatively, the gaming machine 10 may be originally manufactured with the components as shown in FIG. 3. For original manufacture machines, the functions of the gaming board 106 and electronic controller 118 may be combined into a single control device.

With regard to the controller 118, which is in the form of a microprocessor (or microcontroller) based electronic board, it is arranged to monitor data messages generated by the bill acceptor 110. In particular, when a person inserts a bill (such as $5.00 or $10.00 note) or a ticket into the bill acceptor 110 the bill acceptor 110 will generate data that is received by the controller 118 via the data link 120. The controller 118 will process the data to determine whether a bill or a ticket has been inserted into the bill acceptor 110 (that is to determine whether it is bill or ticket data). That is, the data generated by the bill acceptor 110 will include data indicating whether a bill or ticket has been inserted into the bill acceptor 110.

If on processing the data generated by the bill acceptor 110 the controller 118 determines that a bill has been inserted into the bill acceptor 110, the controller 118 places a bill insertion message onto the backplane 108. That is, the controller 118 outputs (or issues) a bill insertion message including the bill data to the gaming board via the backplane. On detecting the presence of the bill insertion message, the gaming board 106 will give the player the amount of game credits equivalent to the bill inserted into the bill acceptor 110. On the other hand if on processing the data from the bill acceptor 110 the controller 118 determines that a ticket has been inserted into the bill acceptor 110, the controller 118 will issue the machine communications interface 132 with a ticket insertion message **124*a* via the link 124. That is, the controller outputs (or issues) a ticket insertion message including the ticket data to the machine communications interface 132** of the ticket processing mechanism.

On receiving the ticket insertion message the machine communications interface 132 communicates ticket information **134*a* with the computer 128, which may act as a server (just as the machine communications interface 132 may act as a client), via link 134, to seek confirmation that the ticket inserted into the bill acceptor 110 is valid. In this regard, the ticket has a barcode printed thereon and the information encoded in the barcode is contained in the ticket information 134*a*. The information related to the barcode that is in the ticket insertion message is provided so that the ticket can be verified when the computer 128 is ‘asked’ by the machine communications interface 132 to verify the ticket. The computer 128 checks the database 130 for the existence of a record that corresponds to the information in the ticket insertion message. The ticket insertion message processor also stores the ticket insertion message in memory 133**. The memory may be persistent so that in the event of a power failure it is possible to determine the state immediately before power loss occurred and take the necessary actions to cleanup or complete the transaction.

Subsequent to checking the database 130 the computer 128 will inform the machine communications interface 132, by way of sending an electronic message, of the existence of a corresponding record. If the electronic message 134*b* received from the computer 128 indicates that no corresponding record exists, the machine communications interface 132 will assume that the ticket is invalid and instruct (by sending an electronic message 124*b* via link 124) the controller 118 accordingly, the control unit will also clear the message from the memory 133. The controller 118 will in turn instruct the bill acceptor 110 to reject the ticket.

On the other hand, if the computer 128 determines that a corresponding record exists in the database 130 it will advise the machine communications interface 132 accordingly (by sending an electronic message 134*c* via link 134), which in effect is an indication that the ticket is valid and which also contains the value of the ticket. In response, the machine communications interface 132 places a game credit message 126*a* containing credit data onto the backplane 108 via link 126 that defines the correct amount of credit. On detecting the game credit message, the gaming board 106 will provide the appropriate number of game credits in the same way as if a bill had been inserted into the bill acceptor 110.

In addition to placing the game credit message onto the backplane 108, the machine communications interface 132 may issue a print ticket message 124*c* containing remainder data to the controller 118 via the link 124. The remainder data specifies the difference in value between the credit data and the original ticket data. On receiving the print ticket message 124*c*, the controller 118 will instruct the printer 112 to print a ticket sending the print ticket message on to the printer 112 via the link 122. If the credit processor machine communications interface 132 issues the print ticket message 124*c*, it will also inform the computer 128 that the message 124*c* has been issued. The computer 128 will inturn make a record of the ticket in the database 130 so that if that particular ticket is inserted into the bill acceptor 110 at a later date (or any other ticket reading device, such as one that might be used by a cashier) the ticket can be verified as previously described.

The advantage of allowing the machine communications interface 132 to be able to effect the printing of a ticket is that, for example, if the ticket has a value of $1.67 and the gaming machine only accepts $1.00 denominations, the game credit message issued by the control unit can be for the value of $1.00, while the remaining $0.67 can be issued on a ticket. The $0.67 ticket could subsequently be inserted into a $0.01 gaming machine to obtain 67 game credits or redeemed for money at a cashier. Accordingly, the credit processor 133*d* is configured to split the value of the ticket based on the minimum acceptable denomination of gaming machine 10.

A person skilled in the art will appreciate from the above description that the gaming board 106 which provides an electronic gaming controller for control of a play of games will not be aware of the existence of the electronic controller 118.

Persons skilled in the art will appreciate that the functions of the electronic controller 118 and the electronic machine communications interface 132 could be merged into a single device. Further details regarding the processes described herein above are provided in Australian patent 2002334685 B2, the content of which is incorporated herein in its entirety.

Figure 4:
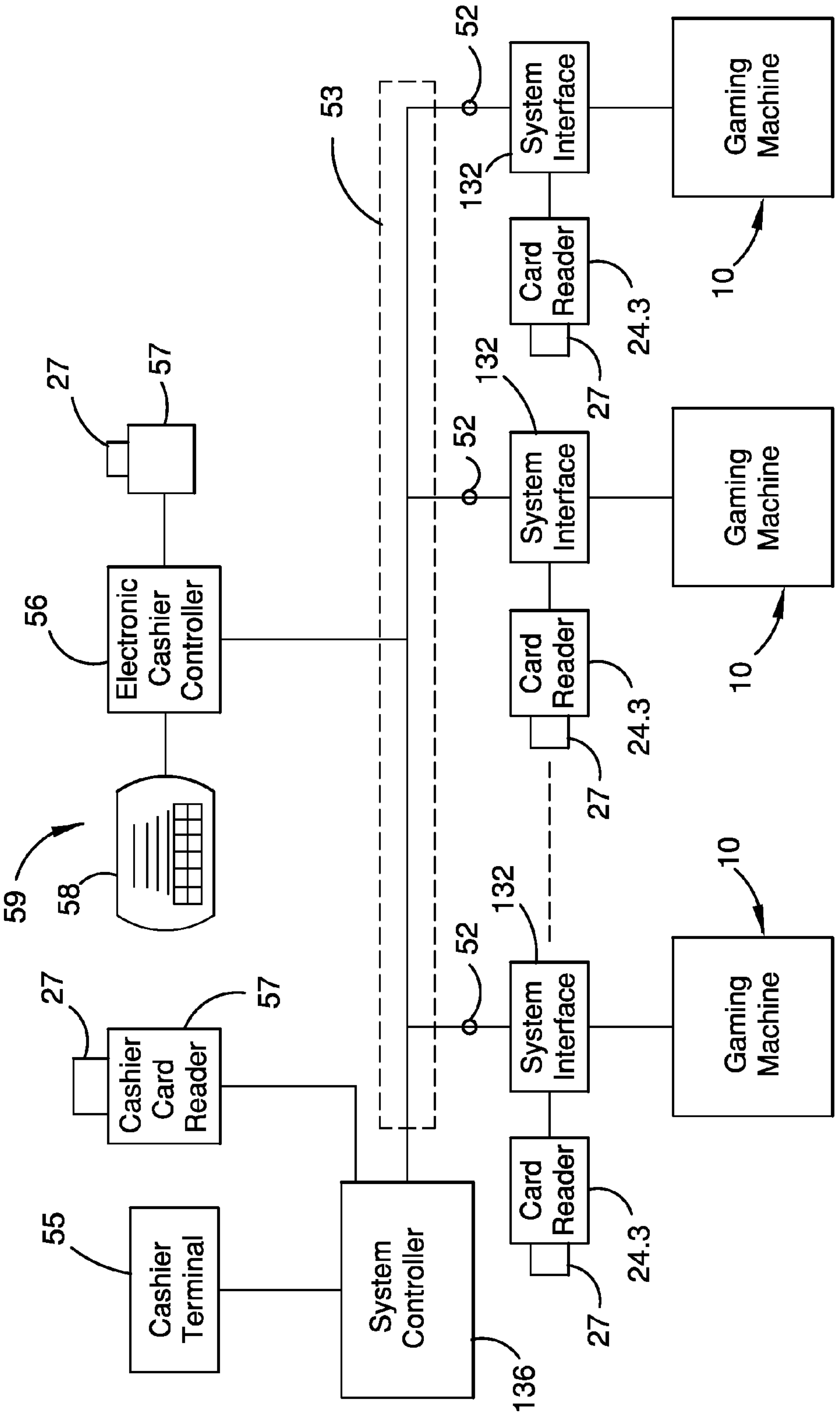
FIG. 4 shows a block diagram of a system implementing an embodiment of the present invention.

Referring to FIG. 4, a system in which the present invention is implemented is illustrated. The system comprises a plurality of gaming machines 10 each connected to a network by its respective machine communication interface 132 and network connection 52. The network connections 52 may be connected to the remainder of the network via a hub 53, although other networking architectures such as daisy chaining may also be employed. Controlling the network is a head system 136 and a cashier's terminal is optionally connected, either to the head system 136 directly, as illustrated in FIG. 4, or alternatively via the network hub 53. The head system 136 may be one or more server processes run on one or more server devices.

The Cashier may be replaced or supplemented by an electronic cashier or cash in/cash out terminal 59 comprising a controller 56 to which is connected a user touch screen 58 and a card reader 57. The electronic cashier uses EFT transactions to debit or credit a player's account at a financial institution to establish or refund a player's credit in the gaming system.

A reservation button 25 is provided as one of the buttons of the button panel 114 and is used in some circumstances to manually reserve the machine such as when the player wishes to go to the bathroom, or go to a designated smoking area. Reservation may be achieved through use of a card-based system or a ticket-based system. The reservation button 25 may be replaced by any other reservation actuator, which indicates an intent by the player of the gaming machine 10 to reserve that gaming machine 10.

The gaming machine 10 may be automatically locked when the player's card 27 is removed, except when the credit on the machine is zero, in which case the machine remains unlocked. In one implementation the gaming machine 10 may have a reserve function button 25 to reserve the machine, by locking it even when the card is removed and credits are zero, provided the reservation button is operated before the card 27 is removed 68, or during a predetermined short period (for example, 5-10 seconds) after the card is removed. The machine may also refuse to register a new card during this period.

In one possible arrangement, the reservation button may be connected directly to the MCI 132 of the gaming machine 10 (also indicated by a dashed line in FIG. 3).

Alternately, instead of the reservation button 25 being interfaced directly to the MCI 132 it may be interfaced to the gaming machine as one of many keys on the button panel 114 (as is common in practice). The gaming machine 10 will then read the button status and communicate it to the MCI 132, and hence on to the system controller 51. Alternately the gaming machine reservation button 25 might be connected 42 to the MCI 132 as well as to the backplane 108, such that the system and the machine may both sense the gaming machine reserve button status directly. The ability to reserve a machine with zero credit is particularly useful in implementations where players are issued cards prior to giving money to the cashier. In this implementation players may be given a card on entry to the gaming establishment with no credit associated with the card on the system or any machine. The player may use the card to transfer money to a machine by using the cashier. Alternately the player can use the reservation button on the machine to lock a machine (with no credits), and then using the cashier transfer credits to that machine. The system automatically detects the reserved machine and transfers credit to it, or if the player chooses, to a different machine (in which case the first reserved machine is automatically unlocked).

Gaming Machine Reservatio—Embodiment 1

In one embodiment, to facilitate the secure transfer of cash to or between machines, each machine 10 is provided with a card reader 111 and the player is issued with an identification card 27 either when entering the premises or when establishing credit in the system. The player tracking card 27 may be a simple magnetic stripe card encoded with a unique code, that may be issued to the player, either when they enter the establishment, or when they establish a credit in the system and is read by the card reader 111. However other methods of player identification can be employed and used in the processes described below. Examples of alternative means to identify players include pin numbers, scannable tags of various known types such as magnetic stripe cards, smart cards, tickets, iris recognition, finger prints or other bio-sensor systems.

Two processes are described below with reference to the flow diagrams in FIGS. 5A and 5B. The first process relates to establishing credit in a gaming system and reserving a machine for play, using the established credit, and generally involves steps 61 to 68. The second process relates to reserving a machine that is currently being played and generally involves steps 68 to 78. In this embodiment both processes are provided, but in alternative embodiments one or other of the process may be provided alone.

First Process—Credit Establishment and Machine Reservation

In summary, in this embodiment, the identification card 27 is inserted into the card reader 111 of a machine by the player after the player has established credit on the system 136 and has had the credit transferred to the desired machine. By inserting the card 27 (see FIG. 2) into the card reader 111 of the machine he or she intends to play, the player identifies himself or herself to the machine and establishes that the credit belongs to them. In the illustrated embodiment, the card reader 111 is not connected directly to the gaming board 106 but to the MCI 132 via the electronic controller 118 (or directly), which is connected to the network via interconnection 52 and to the gaming board 106 via the backplane 108, as seen in FIG. 3. A more detailed description of this process is described below with reference to FIGS. 5A and 5B.

The player gives money to a cashier and selects a gaming machine 10 to play (step 61). The system detects if the gaming machine is currently in use and allows a credit transfer to the selected gaming machine to proceed if the machine is not in use (step 62). The detection means determines that a player is currently using a machine if a valid card is inserted, there are credits on the machine, or buttons or the touch screen has recently been used. For example, the machine may have zero credits but a player is using the gaming machine's built-in help to examine the game. Further detection means, such as physical proximity detection, are possible.

When the credits are transferred to the gaming machine, the gaming machine is automatically locked to prevent play. The player is given a unique key, which is used as a player tracking device and the key is associated with the credits transferred to the selected gaming machine (step 63). The key in this embodiment is the magnetic card 27 encoded with a unique tracking number, and it is inserted into a compatible magnetic card reader 111 on the gaming machine 10 to unlock the selected gaming machine 10.

The player then proceeds to the selected gaming machine and inserts the card 27 to unlock the machine and proceed to play the machine (step 64). As no other player can unlock and hence play the locked gaming machine, line-of-sight visibility is no longer required. Further the cashier need no longer be a person, and could be an automated cash in/out, and card dispensing machine 59.

When the player has finished playing the gaming machine 10, and decides to "cash out" (step 65), they remove the card 27 (step 66) and return it to the cashier (step 67). When the card 27 is removed the gaming machine is again automatically locked, and secured against interference. The player presents the card 27 to the cashier or inserts the card 27 into an electronic cashier 59 and the money remaining on the gaming machine is transferred back to the cashier and paid to the player by the cashier or is dispensed from the electronic cash in/out terminal, and the gaming machine is automatically unlocked for further play (step 67).

Once returned to the cashier the system may either allow the reuse of the card or prevent its further use. The card may be permanently destroyed by physical means, such as punching holes in the magnetic strip. The card may also be destroyed by logical means by recording its unique identification number in a database and not permitting its reuse. Further, cards may be enabled for use only for a preset time, for example within 24 hours of being issued, after which they are permanently disabled.

An unlocked machine with no credits cannot, of course, be played. In some implementations the gaming machines will have alternate means of inputting credits, such as a coin input 109, a bill acceptor 110, and can be played without an identification card. In the case where the gaming machine has no alternate credit input means it may not be necessary to unlock the machine when it has no credits, although this may in fact be done. One other reason to unlock the machine is that help and attract modes may only operate in the unlocked stated. Rather than change the design of current games to display help and attract when locked it may be preferable to simply unlock the machine, even if it cannot be played (because it has no credits).

Second Process—Machine Reservation and Credit Transfer

The player may decide to stop playing the machine either because they wish to move to another machine or because they wish to take a short break (step 68).

To reserve the machine the player would press the reservation button while their identification card 27 is still in the slot of the card reader 111. Then by removing the card, the machine 10 would become locked preventing use of the machine 10 by others until the original player's card is reinserted in the slot of the card reader 111, or until the reservation period times out as discussed below. In the event that the reservation period times out, in a process described in more detail herein below, the machine 10 would transfer any credits held on the machine to a player account in a central controller and unlock the machine for play by another player.

If the player decided to play another machine after having reserved the previous machine they were playing, they would simply insert their identification card into the new machine, which would cause their credit on the previous machine to transfer to the new machine and unlock the previous machine. If, on the other hand, the reservation period had timed out on the previous machine and the player's credit had been transferred to the central controller, then the new machine would simply transfer the player's credit from the central controller to the new machine.

In this case, they will remove their card 27 from the machine (step 69), which will cause it to lock while still retaining the player's credit. If the player chooses to play a new machine (step 71) they will move to the new machine and insert their card 27 (step 73).

The system detects the card 27 is in a different machine (and is no longer in the original machine), and automatically performs a cashless transfer of all the money from the original machine to the new one. Once complete, both machines are unlocked and the player commences playing the new machine (step 74).

In the event that, after the player has temporarily stopped playing 68 a machine and locked it by removing their card 27 in step 69, they return to the same machine and reinsert their card (step 72), they may continue playing that machine (step 79).

Therefore, when the player leaves a machine in step 68, the removal of the card 27 in step 69 leaves the machine locked until the player redeems the outstanding credits from a cashier in step 67 or it is transferred to another machine in step 73. However, it is also possible that they will leave the machine locked permanently if they do not redeem their credits. To prevent this happening the system implements a timeout mechanism (step 70). Preferably, the operator is automatically notified to take appropriate action, such as performing manual cash out on the machine, which results in the player's credit being held at the system controller (step 75) until claimed by the player in steps 77 and 67, or until the player tries to play with the same machine in steps 76 and 72, or a different machine in 78 and 73. A full log of events is stored to enable tracking in case the player returns to play the machine further and a dispute arises with the casino operators. Alternately after the preset timeout period of a locked machine, step 75 involves the system automatically withdrawing credit from the machine and unlocking it for further play. In the event that the player returns to the old machine (step 76) and it is still vacant, they may reinsert their card 27 in the machine (step 72), which will cause the credit to transfer back to the machine after which the machine will allow the player to continue playing 79. Alternatively, the player may choose to select a new machine in step 78, in which case inserting their card 27 into the card reader of the new machine (step 73) will cause their credit to transfer to the new machine, which will unlock allowing the player to commence playing the new machine (step 74). The system may also detect multiple copies of the same card 27 in use, which would indicate either an error in the system or attempted fraud. The system takes appropriate action, such as locking the effected machines and/or setting off an alarm.

In some embodiments of this invention, credits need not be stored at any time by the system, although it can be implemented to do so.

The storage and handling of money is a very sensitive issue, and it is preferable to limit it to those areas in which it is absolutely essential. Gaming machines already require and implement the means to store credits and are carefully tested and regulated to ensure they do so reliably.

In an alternate implementation the player gives money to the cashier (step 61) and it is stored on the system, and associated with the player's identification card 27 (step 63) until the player inserts their card 27 into a gaming machine (step 64). This has the advantage of simplicity from the player's point of view, but does require that credits be kept on the system until the player selects a machine.

It is an advantage of embodiments of the system that the player need not be identified to use the system, although of course this may be done if desired. The means of doing this are well known and not described further.

Gaming Machine Reservation—Embodiment 2

Figure 6:
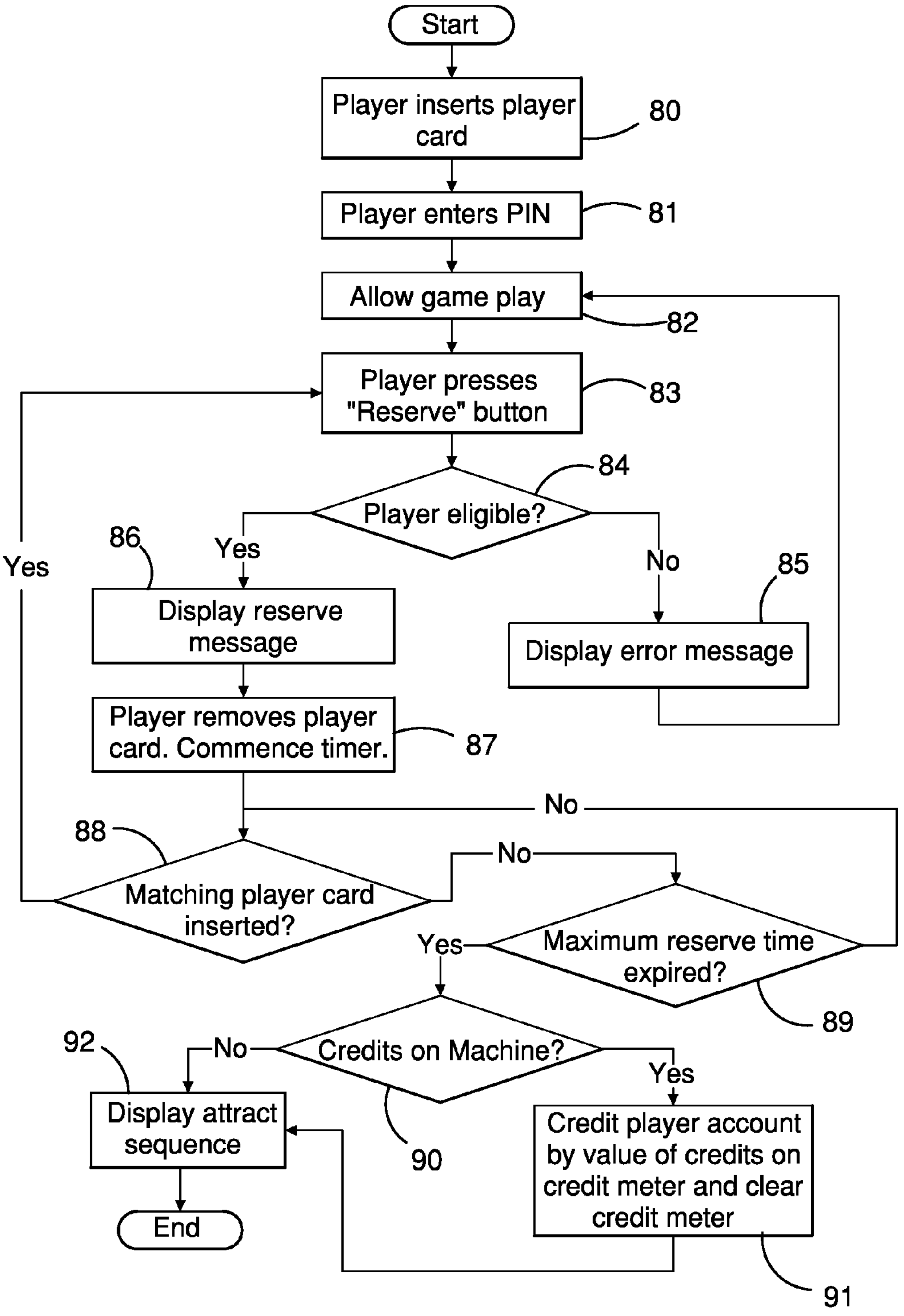
FIG. 6 shows a flow chart of the operation of a further implementation of a method of the invention.

FIG. 6 shows a flow chart of a process which may be performed by the system of FIG. 4 in accordance with another embodiment of the invention. As with embodiment 1, the following description refers to a card-based system, but other means of identifying players may be used.

The process is implemented when a player wishes to reserve a game machine and steps that would be performed by the gaming machine 10 or network that are not directly associated with the reservation function have been omitted from FIG. 6 for clarity of illustration. The description of FIG. 6 refers to the gaming machine 10 communicating with the network, which is intended to include the MCI 132 or another device associated with the gaming board 106 transmitting information onto and receiving information from the network, whether under the control of the gaming board 106 or not.

In step 80, a player inserts a player card 27 into a gaming machine 10. In one embodiment, the player card 27 contains details that identifies a player account that contains credits or funds that may be converted into credits. The gaming machine 10 uses its card reader 111 to read the card 27 and then may request, suitably by displaying a message on its display 14, the entry of a personal identification number (PIN). The player enters their PIN (step 81) and the gaming machine causes the PIN to be verified by comparing it with a pre-stored PIN associated with the player card 27. The pre-stored PIN may be stored on the card 27, or stored by the system, for example in a database of personal identification numbers and associated card numbers.

If the player enters the correct PIN, they are allowed to play the gaming machine 10 (step 82) as the player identified by the player card 27. The player may then use a user interface, for example the pseudo-keypad 29 of the gaming machine 10 to transfer credits to the gaming machine 10 from their player account if the credits were not automatically transferred, and commence play of the gaming machine 10.

Some time after commencing play, the player presses the "Reserve" button 25. In this embodiment only certain players are permitted to reserve a gaming machine 10. Therefore, after the player presses the "Reserve" button 25, or performs some other step indicating that they may wish to reserve the gaming machine, such as removing their player card while credits are still on the credits meter, the gaming machine 10 then checks the player's eligibility to reserve gaming machines 10 or causes the player's eligibility to be checked (step 84). The eligibility of a player to reserve gaming machines may be indicated by data on the player card 27, or by the system, for example in the database 130 in communication with the head system 136 (which may be the same database as that which contains the PIN numbers described previously herein), containing a list of player identification numbers matching the numbers on the player cards, and a flag indicating whether they are eligible to reserve gaming machines 10.

If the player is not eligible to reserve gaming machines 10, then an error message may be displayed on the display 116 of the gaming machine 10 where the player is located, informing them that the reserve function is not available and optionally informing the player how to become a player that is eligible to reserve a gaming machine 10 or why the reservation function is not available. The process then returns to step 82, allowing the player to continue to play the gaming or cash out and quit playing. If the player has simply removed their player card without pressing a reserve button and there are credits on the machine, the system may automatically reserve the machine if the player is eligible, and if not, automatically transfer credits on the machine to the player's account if the player is not eligible to reserve the machine.

If the player is eligible to reserve gaming machines 10, then in step 86 the gaming machine 10 that the player was playing locks and displays a "Reserved" message, either on the display 116, on a display 132A (see FIG. 3) associated with the system interface 51, on both, and/or elsewhere. If the player has not already done so, they then remove their player card in step 87, which commences a timer. Optionally, the card may be automatically ejected from the card reader 111 and visual and/or audible alerts may prompt the player to take their card 27. For example a beeping may sound and a bezel (not shown) around the slot of the card reader 111 may flash and/or a prompt may be displayed on one or both the displays 14 and 51A.

While the gaming machine 10 is reserved, it monitors for the re-insertion of the player card of the player who reserved the gaming machine 10 (step 88). If a machine player card 27 has been reinserted, the process returns to step 82 and the player is allowed to continue to play the gaming machine 10. As described previously herein, the gaming system may also monitor for re-insertion of the player card at another gaming machine 10, in which case the credits may be transferred to the new machine, or back to the player's central account and the reserved machine unlocked. If a matching player card 27 has not been reinserted, the gaming machine 10 checks in step 89 whether the maximum reserve period has expired by checking the value of the timer started in step 87. If the maximum reserve period has not expired, then steps 88 and 89 are repeated.

If the maximum reserve time has expired, then the process proceeds to step 90, in which case the gaming machine 10 checks if there are any credits on its credit meter. If so, the credits are transferred to the player's account, identified by the player identification number stored on the player card and read by the gaming machine 10 when the player first inserted their card, and the credit meter is cleared to zero (step 91), and the process then proceeds to step 92. Step 91 may be achieved by the gaming machine 10 sending data addressed to the head system 136 or other server or device connected to the network, which is adapted to maintain a record of player identifiers and credit balances.

If there were not credits on the machine, the process may proceed from step 90 directly to step 92. In step 92 the gaming machine 10 is unlocked and may display an attract sequence to advertise the availability of the gaming machine 10 to be played and attract players to that gaming machine 10.

In another embodiment of the present invention, step 91 may be automatically performed following the reservation of a gaming machine 10, for example following step 87. In this embodiment the credits may be transferred back to the gaming machine 10 if it is determined in step 88 that a matching player card has been reinserted, prior to allowing game play to continue in step 82.

In an embodiment of the present invention, the gaming machine 10 awaits confirmation of receipt of the information that it sent notifying of the value on the credit meter before clearing the credit meter in step 91.

Although the example of an embodiment of the invention described in relation to FIG. 6 assumes that each player has a central player account, in alternative embodiments of the invention, the central player account may be omitted. In this case, the player may still use a player card, PIN and/or other information to identify themselves. However, the player carries their funds with them, for example on the player card, or by inserting money or money's worth into a credit mechanism. In this embodiment, if the player reserves a gaming machine 10, and the maximum reserve period expires, the number of credits, if any, still on the gaming machine, or a value indicating the money's worth of the credits, are stored in a database associated with the player identification information. When the player returns to a cashier's station they may be notified of their credits and paid the funds.

The eligibility of player to reserve gaming machines 10 may be qualified in a number of ways. For example, instead of having a binomial "yes" or "no" eligibility that applies for all gaming machines 10 in any location, at any time, the eligibility may be qualified by any or all of the following:

a) The player is eligible to reserve only certain gaming machines, or a certain type of gaming machine. For example, the player may only be allowed to reserve gaming machines in a certain area at a gaming venue, only allowed to reserve gaming machines that play a certain denomination or range of denominations, or only allowed to reserve gaming machines at a particular gaming venue where the gaming system is in communication with or controls multiple venues. In another example, only certain players may be eligible to reserve a gaming machine with zero credits on the meter.

b) The player is eligible to reserve gaming machines only during certain periods. The periods may be fixed, for example between 10 am and 3 pm, or may be variable, for example as set by a casino administrator, or dynamically determined depending on demand for gaming machines at the time.

c) There may be varying classes of eligibility. For example, some classes of player may be able to reserve a gaming machine for up to 5 minutes, while others may be able to reserve the same gaming machine for up to 10 minutes. The classification of the player may also determine what gaming machines they can reserve and during what periods they can reserve the gaming machine. The classification of the person may be determined using any method, for example by indicating whether they are a member of a loyalty program provided by the gaming venue, based on the player's past gaming history, or otherwise. Information indicating the player's status may be stored centrally in the gaming system or alternatively stored on a player card or other player identification device readable by a gaming machine 10, for example a magnetic swipe card or a smart card.

d) The number of times that a player can reserve a gaming machine in any given period may be limited. For example, a player may be eligible to perform a reservation of a gaming machine up to five times in any 24 hour period. Again the classification of the player may also influence the number of reserves allowed to be made in any given period of time. A player may be able to earn "reserve credits" through play on the gaming machines at a casino and/or otherwise. The "reserve credits", once earned can be redeemed each time a machine is reserved, for example taking a fixed amount for each reserve, or taking a variable amount depending on characteristics of the reserve, including the duration of the reserve, the day, or time of day, or what the current demand is for gaming machines at the venue.

e) The eligibility of a player to reserve machines may be determined based on the funds held in the credit meter of the gaming machine or machines that they are currently playing and/or based on the funds held in a player account associated with their player identifier.

For option d), the reserve credits may be able to be traded for reserve time on a gaming machine, so that an eligible player is one with a positive balance of reserve credits, or reserve credits above a threshold value. For example, each minute of reservation may require five reserve credits. In this embodiment, the maximum reserve time may be dictated solely by the reserve credits, or the maximum time may be otherwise determined. Alternatively, a reserve may be initiated with a maximum reserve period of five minutes by trading in ten reserve credits. The number of reserve credits required and the rate of accumulation of reserve credits may be configurable.

In a still further alternative for option d), a player may need to play at a gaming venue or at any one of a number of gaming venues a certain amount and once that threshold is achieved, they may be given the ability to reserve gaming machines for a bonus period, for example one month. Optionally, the player may have to reach the threshold within a certain time limit, for example over a single month.

For option e), The values that result in eligibility may be configurable to provide control over which players are eligible. For example, the venue operator could set a minimum credit value of $500 in the player account and/or in the credit meter for the player to be eligible to reserve a gaming machine. The gaming machine or gaming system may also allow the venue operator to set a maximum value. For example the player account and/or credit meter may need to have a value of $2000 or less before the player is eligible to reserve a gaming machine. The thresholds could be compared with the amount in the credit meter alone, the amount in the player account alone, or compared with a combination of the values in the credit meter and the player account, for example by adding the values together.

The value in the credit meter may be converted to an actual dollar value and then compared to the eligibility criteria. Using this method, players playing a relatively high denomination machine only have to have the same equivalent dollar amount in the credit meter as players on a relatively low denomination machine. However, in another embodiment the determination of eligibility may be made with reference to the number of credits on a credit meter without reference to the equivalent dollar amount, in which case the higher the denomination of the machine, the more funds required before the player becomes eligible to reserve the machine.

Different amounts of funds may result in the player being eligible for different levels of reservation. For example, a player with between $500 and $1000 may be eligible to reserve some machines but not others and a player with between $1000 and $2000 may also be able to reserve some or all of the other machines. Other eligibility criteria may be varied dependent on the funds in the credit meter and/or in the player's account, including for example the maximum duration of a reservation and/or the times during the day when a machine may be reserved. Increased ability to reserve gaming machines may be provided to players with higher amounts in the credit meter or player account. However, it is also possible to reduce the ability of players to reserve machines should the value exceed a certain amount.

In one embodiment, the duration that a machine can be reserved may be related to factors other than individual player eligibility, which may be used instead of or in addition to the player eligibility criteria. For example, during times when the gaming venue operator expects there to be high demand for gaming machines 10, the maximum duration of reservation may be increased and/or any cost of reservation, in "reservation credits", normal credits or otherwise may be increased. The maximum duration of reservation and/or cost of reservation may vary intra-daily, daily, weekly, monthly and/or yearly and may also be manually adjustable by the gaming venue operator. The determination of the maximum duration or cost of reservation may be made automatically.

The head system 136 may track indicators of demand, including for example how many machines are currently being played, how many machines are currently reserved and an entrance machine or a cash in/cash out terminal 59. Using these inputs, the head system 136 may vary the maximum duration and/or cost of reservation. For example, the head system 136 may be able to select between three levels of reservation: 7 minutes, 12 minutes, 20 minutes and two levels of cost: 1 credit per minute or 2 credits per minute. With between 0-30% of machines in play, player may be able to reserve their machines for up to 20 minutes. With between 30-60% of machines in play, players may be able to reserve machines for 12 minutes at a cost of 1 credit per minute. With between 60-80% of machines in play the maximum duration may decrease to 7 minutes. If over 80% of the machines are in play the cost may increase to 2 credits per minute and the head system 136 may limit the ability to reserve machines to a certain number. The head system 136 may implement a waiting list for reservations in implementations where the number of reservation is limited. Limits on the number of machines that can be simultaneously reserved may be implemented for all time and the limit may be fixed, or variable dependent on time/day, or on one or more measures of demand.

The system may monitor the number of machines that are currently reserved and if the number exceeds a certain value, for example 10%, then the duration of reservation for new reservations may be reduced and/or the cost of reservation increased. Variation of the maximum time or cost of reservation may also depend on how many people are at the gaming venue as determined from operation of the cash in/cash out terminal 59 or an entrance machine, relative to how many machines are being played and reserved.

In addition, control over the ability to reserve machines, duration for which machines may be reserved and cost of reservation may vary for different types of machines. For example, if a new bank of gaming machines has been introduced, the gaming venue operator may deactivate the ability to reserve any of the machines for the first few months that they have been released. Also, demand may be measured for types of gaming machines, instead of for all gaming machines at a venue. For example, if there are ten gaming machines that play a certain game, the head system 136 may vary the reserve parameters for those ten gaming machines dependent on how many are currently being played. The type of gaming machine that is monitored may be specified by the particular game, by the game denomination so that different games of the same denomination are grouped for the purposes of controlling the reservation function, or otherwise.

The determination of eligibility may be made by the gaming board 106, by the head system 136, or by another device in the gaming system.

Machine to Machine Credit Transfer Protocol

The system is designed such that a fault during the cashless transfer, such as a power failure or communication error, does not cause credit to be added or lost. Such techniques are well known, and one example, in which the system does not store player credit information, is described here by way of example.

When the magnetic stripe card is inserted into the new machine it is detected and a message sent to the system controller with the cards identification. The system determines that the card had been previously played on a different machine, and adds the exact same amount of credits to the new machine as exists on the previous machine.

At this point the player may start to play, but the previous machine still contains its credits unchanged, and remains locked. The system then removes the credits from the first machine and unlocks it.

The system logs each of these events and in the event of a failure can determine how to recover. Preferably a human readable log of events is simultaneously printed, identifying each cashless transaction. If a failure occurs before credits are transferred to the new machine, they still exist on the first machine and are not lost. If the failure occurs after the transfer to the new machine, the player cannot lose credits. Until the first machine is unlocked it cannot be played, so the operator will not lose any credits on that machine. The electronic or printed log may be used to understand the actual events and reconcile accounts.

Gaming Machine Reservation—Embodiment 3

Figure 5A:
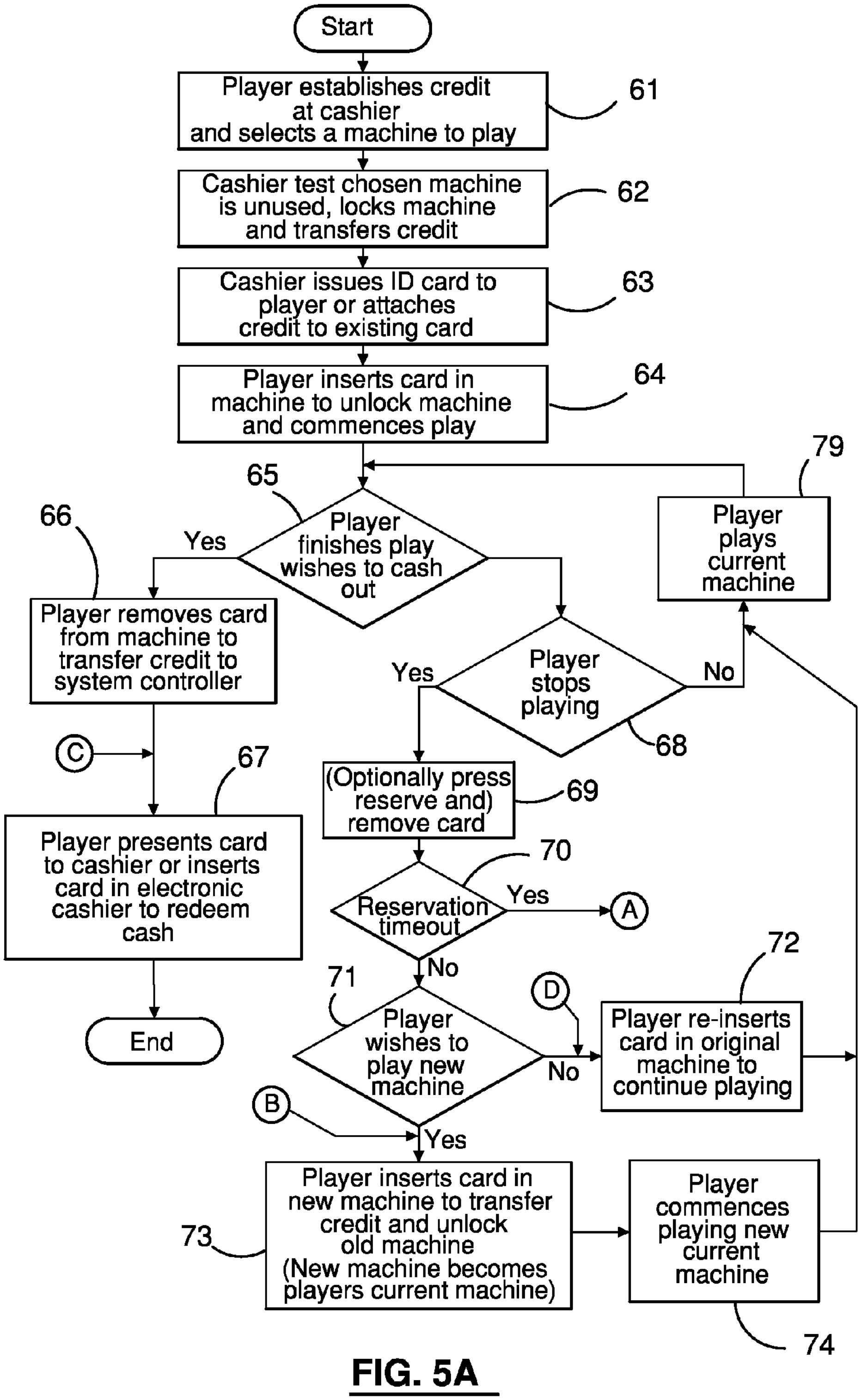
FIGS. 5*a* and 5*b* show a flow chart of the operation of an implementation of a method of the invention.
Figure 5B:
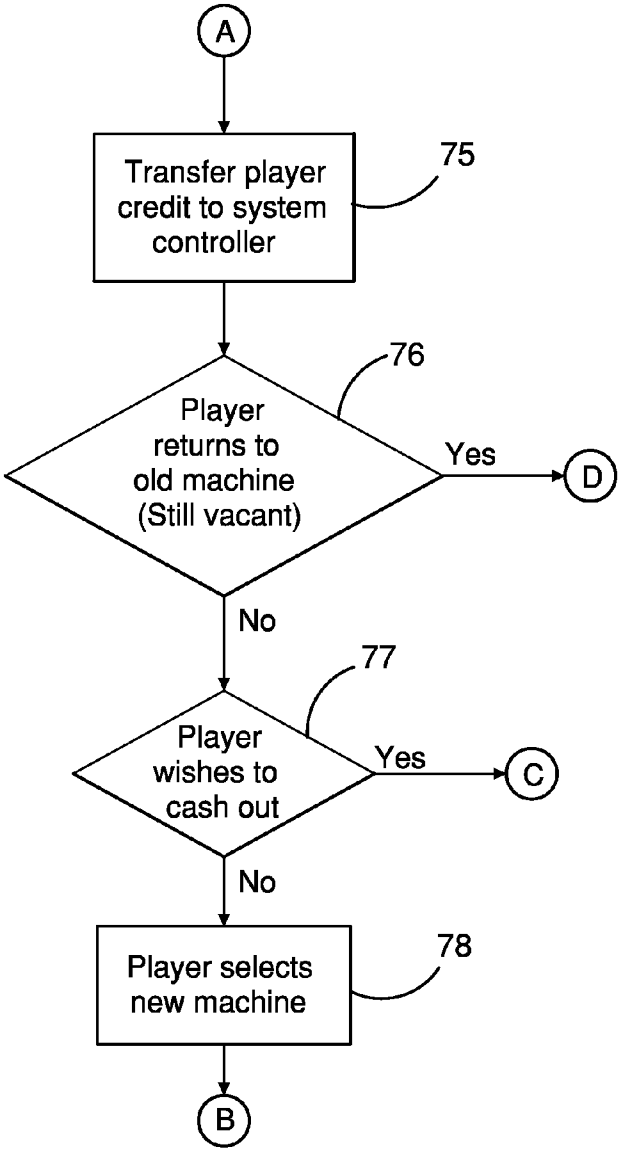

Referring again to the gaming system described herein with reference to FIG. 3, the processes described in relation to FIGS. 5A, 5B and 6 may be implemented using tickets 110A rather than a card. For the processes described in relation to FIG. 6, some of the eligibility criteria may not be available for use, depending on whether the players are identified when using their tickets. The ticket-based system may replace the card-based system, or operate in parallel with the card-based system to allow reservation of gaming machines.

In an embodiment that uses tickets, the credit of a player may be transferred onto the ticket. In other words, the player is issued a transferrable ticket that they carry with them and has a monetary value. Accordingly, in this embodiment, if a player reserves a gaming machine that they are currently playing, then the credit is transferred from the gaming machine onto the ticket. If the player returns to the same gaming machine, then the player can insert the ticket to release the reserve on the gaming machine and transfer credit back onto the gaming machine from the ticket.

In another embodiment, the ticket may be a simple reservation ticket. In this embodiment, like some of the card-based systems described herein, credit may be retained on the gaming machine or transferred to an account associated with the ticket that is maintained in the head system 136.

The process of reserving a gaming machine 10 will now be described. The player has credits on a credit meter maintained by the gaming board 106 and indicates that they wish to reserve the gaming machine 10, for example by pressing a reserve button that is part of the button panel 114. The gaming board 106 sends a print instruction to the thermal printer 112 to print a ticket 110A. The print instruction includes instructions to print on the ticket the amount of credit that is currently held in the credit meter and a unique identifier for the ticket. In response, the thermal printer 112 prints a ticket 110A with machine-readable indicia that indicates the amount of credit and the unique identifier and sends a confirm print message back to the gaming board 106. The gaming board 106 then communicates a reserve message 134*d* to the head system 136 via the backplane 108 and the MCI 136. The reserve message 134*d* includes a unique identifier and an identifier of the gaming machine that printed the ticket. The gaming board 106 then removes the credit from the credit meter and locks the gaming machine 10. However, the electronic controller 118 keeps the bill acceptor 110 active, allowing it to receive tickets and bills. In some gaming machines the game controller may lock the ticket reader when the gaming machine is reserved. Accordingly, the electronic controller 118 allows the bill acceptor 110 to perform its function as ticket reader when the gaming machine is reserved, when otherwise it may be inoperable, locked by the game controller. In other embodiments, the game controller itself may be adapted to keep the bill acceptor 110 (or other ticket reader) active.

The head system 136 receives the reserve message 134*d* and stores the ticket and gaming machine identifiers in its database 130. Optionally, the reserve message 134*d* may also communicate the amount of credit associated with the ticket, either as a check when transferrable tickets are used, or as a record of the amount of credit that the player has if non-transferrable tickets (i.e. tickets that are not recognised as carrying a value) are used.

If another ticket or a bill is inserted into the bill acceptor 110 of the gaming machine that has been reserved, then the bill acceptor 110 reads the ticket and passes a read message to the electronic controller 118. The electronic controller 118 then sends a ticket insertion message 124*a* to the MCI 132, which sends a ticket message 134*a* to the head system 136. The ticket insertion message 124*a* in this embodiment includes the identifier of the gaming machine 10 and the identifier of the ticket. The head system 136 checks whether it has a record for the ticket and may perform a validation process similar to that previously described herein. Whether the amount on the ticket is validated or not will depend on whether the reserve message 134*d* contained information identifying the amount that was on the credit meter of the gaming board 106 when the gaming machine 10 was reserved.

If the ticket is valid and its identifier matches the identifier that was contained in the reserve message 134*d*, the head system 136 confirms this with a ticket valid message 134*e*, addressed to the gaming machine 10. The electronic controller 118 receives this message and instructs the gaming board 106 to unlock, for example by communicating the ticket identifier and ticket value to the gaming board 106 via the backplane 108. The gaming board 106 then increments its credit meter by the value of the ticket and unlocks, allowing the player to continue game play on the gaming machine 10. If the ticket identifier does not match the identifier in the reserve message 134*d*, then the head system 136 instructs the electronic controller 118 to control the bill acceptor 110 to eject the ticket. When the gaming machine 10 is reserved, the electronic controller 118 may control the bill acceptor 110 to automatically eject all bills inserted into the bill acceptor.

If the ticket was inserted into another gaming machine 10 (i.e. another gaming machine in communication with the head system, being a machine that did not print the ticket) and that gaming machine was not reserved, then the following process is completed. The head system 136 identifies the ticket identifier and gaming machine from the ticket insertion message 124*a*. It then validates the ticket and sends a ticket valid message 134*e* to the gaming machine 10 in which the ticket was inserted. The player can then play the gaming machine 10, using credit from the ticket.

In addition, the head system 136 sends an unlock message 134*f* to the gaming board 106 that caused the ticket to be printed, which causes the gaming machine 10 that printed the ticket to become available for play, if it has not already become available, for example due to expiration of a maximum reserve time (see the embodiments described previously herein).

Where an identified player reserves a gaming machine, that player may be able to unlock the gaming machine 10 using either the printed ticket or their player identifier. For example, a player may press a reserve button on the button panel 114, which causes a ticket to be printed. The player may return to the gaming machine 10 and either insert the ticket or provide their identifier. If the ticket is inserted, then the value on the ticket is transferred to the credit meter and the player is allowed to play the gaming machine. If the identifier is provided, for example by inserting a player tracking card into the card reader 111, then the gaming machine may unlock, but may maintain zero credits on the credit meter. The player could then provide credit for play by any means, including inserting the ticket that was printed on reserving the gaming machine if they wish. If the player does not insert the ticket, he or she may redeem the ticket later, for example at a cashier's terminal when leaving the gaming venue, or at another gaming machine.

To provide this dual functionality to unlock a reserved gaming machine, the electronic controller 118 keeps both the bill acceptor 110 and the card reader 111 active when the gaming machine 10 is locked. If dual functionality is not required, one or other of the bill acceptor 110 and card reader 111 may inactive when the machine is locked.

The functions of the electronic controller 118 and the gaming board 106 described in this embodiment, like previously described embodiments, may be combined into the gaming board 106. Alternatively, the functions may be distributed differently between the electronic controller 118 and gaming board 106. In addition, although the bill acceptor 110 has been described herein as the ticket reader, the ticket reader need not also function as a bill acceptor.

Alternative Gaming System Implementation

Figure 7:
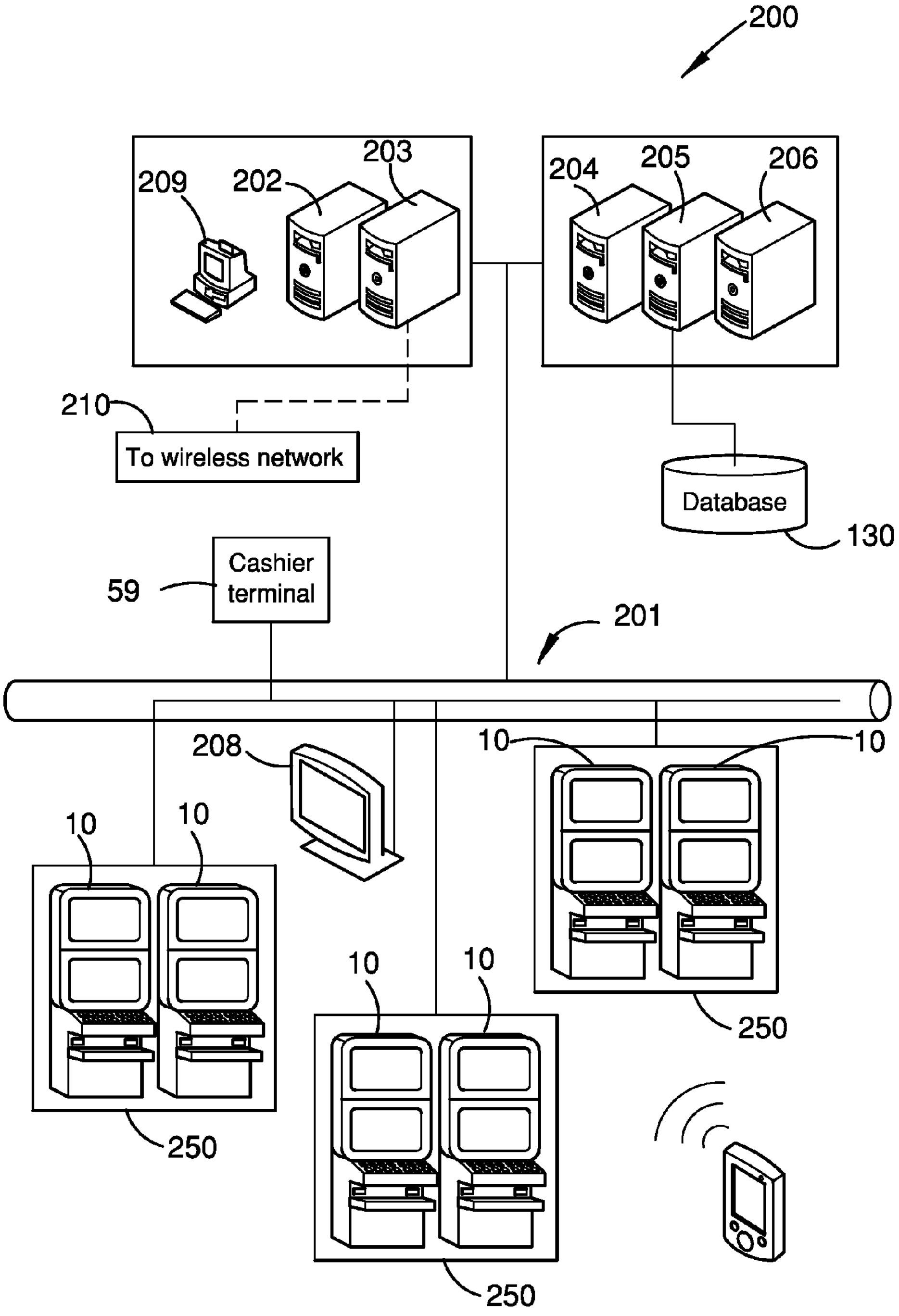
FIG. 7 shows a diagrammatic representation of another system implementing an embodiment of the invention.

FIG. 7 shows an alternative gaming system 200 to the gaming system shown in FIG. 4, in which embodiments of the present invention may be implemented. The gaming system 200 includes a plurality of gaming machines 10, in this embodiment arranged in three banks 250 of gaming machines, each bank 250 consisting of two gaming machines 10. The gaming machines 10 communicate via a bank controller (not shown) with a network infrastructure 201, which may be in the form of an Ethernet, but may be any suitable proprietary or non-proprietary fixed line or wireless network.

The gaming system 200 may include one or more displays 208 that may be controlled by a network device. The displays 208 may be plasma screens and if provided will typically be large screens able to be viewed from a particular area of the gaming venue by a number of people.

A collection of servers 202-206 provide various functions for the gaming system 200. The servers 202-206 be distinct physical devices, or may be server processes run on one or more physical devices. One or more databases 207 may provide electronic data storage for the gaming system 200. The database 207 may store player account information, the storage and retrieval of which may be managed by the server 205. An administrator terminal 209 may be provided to allow a gaming venue operator to configure aspects of the gaming system 200, run reports and perform other gaming floor management and administration activities.

The server 203 may act as a gateway to a wireless network 210, which may allow the server 203 to send messages to a portable device, for example the personal digital assistant (PDA) 211. Two way communication between the server 203 and the PDA 211 may also be provided. If the network infrastructure 101 is a wireless network, then a second wireless network may be unnecessary.

An electronic cashier or cash in/cash out terminal 59 is provided in communication with the network infrastructure 201, which may be used to perform the same functions as the terminal described in relation to FIG. 4.

In this embodiment, the operations of the head system 136 are performed by the servers 203 and 205. The server 205 may manage the player accounts of players in the database 130. Suitable database management servers and processes are known in the art and will not be described further herein. The server 103 may manage the reservation of the gaming machines 10.

Figure 8:
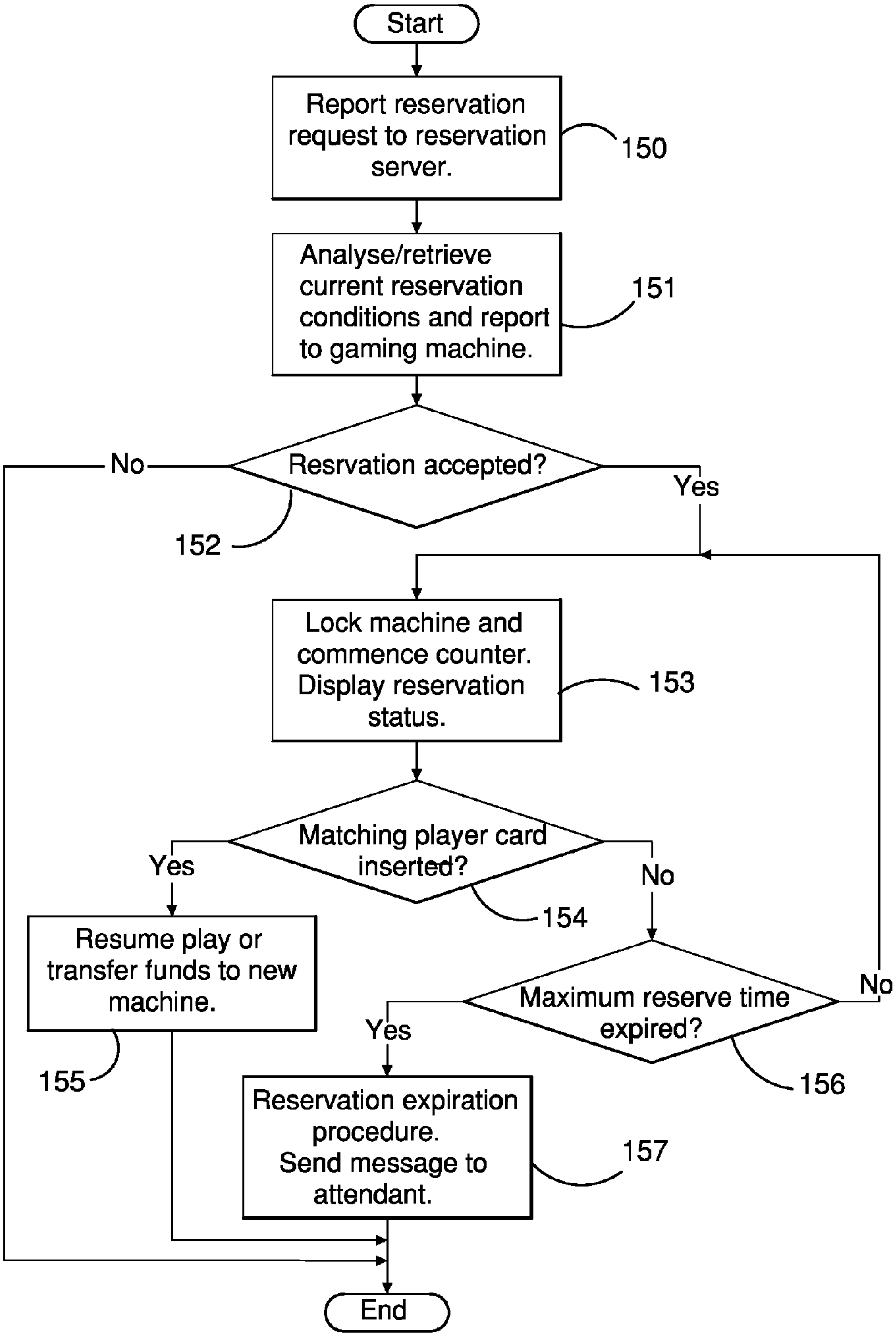
FIG. 8 shows a flow diagram of a process performed by a gaming system in accordance with an embodiment of the invention.

The gaming system 200 may implement the method described herein in relation to FIG. 6, including transferring credits between different gaming machines. The gaming system 200 may also perform the method described in relation to FIGS. 5A and 5B. In addition, the gaming system may perform the process shown in FIG. 8. This process may form supplementary steps following step 84 to the process described herein in relation to FIG. 6 and this implementation is assumed for the remainder of the description of the process shown in FIG. 8.

At step 150, the player has either pushed a "Reserve" button, or removed their player tracking card while the credit meter of the gaming machine 10 still has credits on it. In response, the gaming machine 10 reports the request for reservation to the server 103. At step 151, the server 103 receives the request and reports back to the gaming machine 10 the reservation period and/or cost. In one implementation, the server 103 may look up a table that lists periods throughout the day and the reservation time allowed during those times and reports this back to the player of the gaming machine 10. The gaming machine 10 then displays on the display a message indicating the reservation time and may also ask for confirmation that the player wishes to proceed.

Confirmation of the reservation may be important in embodiments where there is a cost associated with reservation and even more so where the maximum reservation time and/or cost per minute of reservation time purchased is variable. In other embodiments, receipt of confirmation may be less important and may be omitted from the process.

The gaming machine 10 monitors its user interface for confirmation of the reservation (step 154). If the reservation offer is not accepted, the process ends and the player has the choice to either continue playing, or cash out from the gaming machine.

If the reservation is accepted, the process continues to step 153, in which case the gaming machine 10 is locked and displays a reserve message. A reservation counter is also commenced. The server 203 associates the counter with an identifier of the player who reserved the machine. This identifier may be an identifier read from the player tracking card in step 80 of the process described in relation to FIG. 6.

Figure 9:
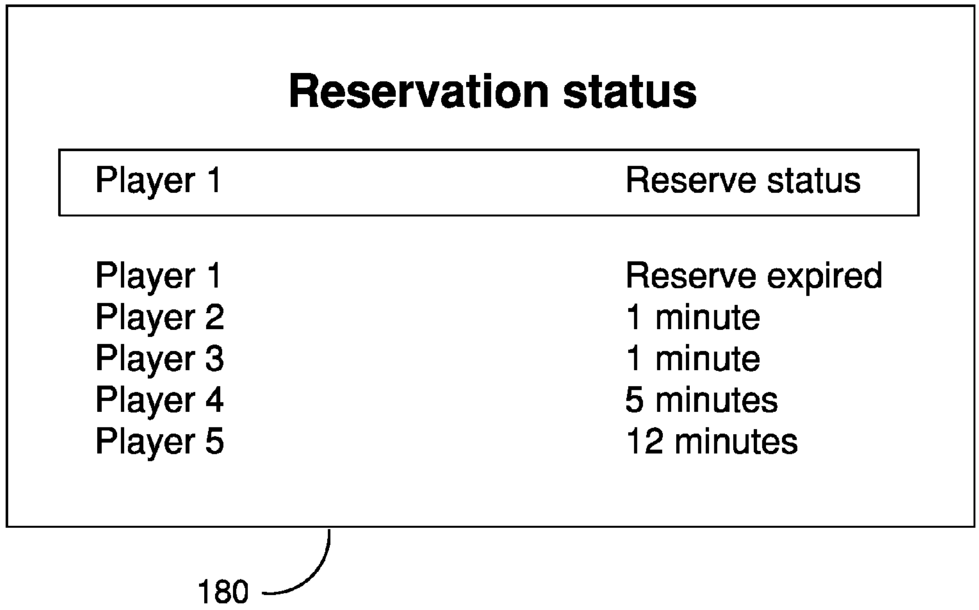
FIG. 9 shows a screen display that may be displayed on a display of the system shown in FIG. 7 in accordance with one part of the process shown in FIG. 8.

The server 203 may also control the display 208 to display the reservation status of reserved gaming machines. A very schematic representation of a possible screen display 180 is shown in FIG. 9. The screen display 180 includes a heading "Reservation status" and a list of players and the status of their reservation. Player 1 is shown as having a reservation expired. This means that either the gaming machine 10 has been unlocked, and is available for others to play, or is about to be unlocked. The server 203 may, for example, cause the display 208 to display this for two minutes after the reservation timer reaches the maximum reservation time. Players 2-5 each have between 1 and 12 minutes reservation time remaining.

The server 203 may display information for all currently reserved gaming machines 10 on the display 208. If there are too many to fit on a single screen, then the information may scroll. In one embodiment, the server 203 may only display the status for machines within a certain time from the maximum reservation time, for example within ten minutes of reservation expiration. A large display 208, for example a plasma screen may for example be located at a designated outdoor smoking area. Displays at other locations may also be provided.

The status of Player 1 may continue to be displayed until the gaming machine actually becomes unlocked. The gaming system may allow a grace period of fixed or variable duration after the expiration of the reserve period. In the embodiment where an attendant unlocks the gaming machine, the reserve status may continue to be displayed until the gaming machine is actually unlocked.

Certain displays may selectively display the status of certain gaming machines 10. For example, at a large venue, each display 208 may display the status of gaming machines 10 on the same floor. In another embodiment, players may insert their player tracking card into a reader at a location, or otherwise provide the identifier used to reserve the gaming machine 10 and in response the server 203 may cause a display at that location to display the reservation status for that player.

The process then cycles around steps 153, 154 and 156 until the player returns to the gaming machine 10, starts play at another gaming machine 10, cashes out at a cashier terminal 59, or the reservation time expires. Steps 154 and 156 are similar to steps 88 and 89 described in relation to FIG. 6.

If the player returns to the gaming machine 10, starts play at another gaming machine 10, cashes out at a cashier terminal 59, then the process proceeds to step 155 and play at the gaming machine 10 is resumed, or funds are transferred to the new gaming machine 10 or to the cashier terminal 59 as required and the reserved gaming machine 10 is then unlocked. If the reservation time expires, then the process proceeds to step 157 and a reservation expiration process is completed. This may involve 90-92 described previously relation to FIG. 6. The gaming machine 10 may then automatically unlock. Alternatively, the server 203 may send a message to an attendant to unlock the gaming machine 10. This message may be sent to the PDA 111. The attendant may then use the PDA 111 to unlock the gaming machine 10. The attendant may also use the PDA 111 to lock a gaming machine 10.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

Throughout the specification the term “comprise” and variations on this term including “comprising” and “comprises” are to be understood to imply the inclusion of a feature, integer, step or element, and not to exclude other features, integers, steps or elements.

The invention claimed is:

1. A gaming system including:

a system controller in communication with a plurality of gaming machines, the system controller providing credit to a gaming machine and causing the issuance of a ticket at a site remote from the gaming machine, wherein when the gaming machine receives the credit the gaming machine is locked for a predefined period of time so as to prevent play of the gaming machine, but keeps a ticket reader active, wherein the gaming machine unlocks and allows play of the gaming machine using the credit when the ticket is read by the ticket reader; and a reservation counter that commences to countdown the predefined period of time when the gaming machine is locked, the gaming machine being unlocked when the predefined period of time expires;

wherein the system controller is configured to control the display of a reservation status indicative of the predefined period of time that the gaming machine is to remain locked, the reservation status being displayed on a display that is viewable by the player at a location remote from the locked gaming machine.

2. The gaming system of claim 1, wherein the gaming machine includes a ticket printer and a reservation actuator operable by a player of the gaming machine to indicate that the gaming machine is to be reserved and wherein when the reservation actuator is actuated, the ticket printer prints a ticket and the gaming machine locks, maintaining the ticket reader active, and the gaming machine unlocks when the ticket reader reads the printed ticket.

* * * * *

UNITED STATES PATENT AND TRADEMARK OFFICE

CERTIFICATE OF CORRECTION

PATENT NO. : 8,512,118 B2
APPLICATION NO. : 12/103429
DATED : August 20, 2013
INVENTOR(S) : Lui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this
Seventeenth Day of March, 2015

Michelle K. Lee

Michelle K. Lee
*Director of the United States Patent and Trademark Office*